United States Patent [19]

Martin

[11] Patent Number: 4,507,449

[45] Date of Patent: Mar. 26, 1985

[54] OLEFIN POLYMERIZATION

[76] Inventor: Joel L. Martin, c/o Phillips Petroleum Company, Bartlesville, Okla. 74004

[21] Appl. No.: 523,535

[22] Filed: Aug. 16, 1983

[51] Int. Cl.$^3$ ............................ C08F 4/44; C08F 4/64; C08F 210/00; C08F 110/02
[52] U.S. Cl. .................................... 526/122; 526/139; 526/161; 526/169.2; 526/348; 526/352; 252/429 B; 502/131; 502/132; 502/162; 502/209
[58] Field of Search ............... 526/139, 122, 118, 161, 526/169.2, 348

[56] References Cited

U.S. PATENT DOCUMENTS

| | | | |
|---|---|---|---|
| 2,969,345 | 1/1961 | Coover, Jr. et al. | 260/93.7 |
| 3,186,977 | 6/1965 | Coover, Jr. et al. | 260/93.7 |
| 3,345,351 | 10/1967 | McCall et al. | 260/93.7 |
| 3,700,638 | 10/1972 | Kawasaki et al. | 526/122 |
| 3,929,745 | 12/1975 | Huerta et al. | 526/161 |
| 4,376,064 | 3/1983 | Hoff | 526/139 |

*Primary Examiner*—Joseph L. Schofer
*Assistant Examiner*—Fred Teskiu

[57] ABSTRACT

A process for producing a novel highly active vanadium catalyst comprising a particulate solid produced by reacting a vanadium compound, a phosphorus compound, and a metal halide compound and its use in the polymerization of olefins.

16 Claims, No Drawings

OLEFIN POLYMERIZATION

BACKGROUND OF THE INVENTION

This invention relates to a process for producing olefin polymers and to a high activity catalyst suitable for use in the process.

The present invention relates to a catalyst, a method for making the catalyst and a polymerization process for employing the catalyst. In accordance with another aspect, this invention relates to an improved olefin polymerization catalyst produced by reacting a vanadium halide compound, an organophosphorus compound, and a metal halide. In accordance with another aspect, this invention relates to a catalyst system comprising a vanadium-containing catalyst component and a cocatalyst comprising an organoaluminum compound. In accordance with a further aspect, this invention relates to the use of metal halides of periodic groups IIIA, IVA and VA in the formation of a vanadium-containing catalyst useful for the polymerization of olefins to form polymeric products having a broad molecular weight distribution. In accordance with still another aspect, this invention relates to the formation of ethylene polymers having a broad molecular weight distribution formed in the presence of a vanadium-containing catalyst produced as set forth herein.

It is old in the field of olefin polymerization to prepare solid polyolefins by employing catalyst systems comprising a transition metal compound and an organometallic cocatalyst. Until fairly recently most of such catalyst systems were relatively low in activity and as a result generally required the employment of a catalyst removal step in order to obtain a polymer having satisfactory properties. Recently, however, much research has been directed toward the discovery of catalyst systems that are so active that catalyst residues in resultant polymers are low and, thus, there is no need to employ the catalyst removal step. Such catalyst systems are obviously of significant commercial importance since they allow for appreciable reductions in the costs of producing such polymers.

The preparation of high activity ethylene polymerization catalysts based on vanadium are known. Ethylene polymers obtained from these catalysts are linear and saturated. The molecular weight distributions usually obtained, however, are broader than from other organometallic catalysts and to a certain extent, controllable. For some applications it is desirable to have still broader molecular weight distributions. One of the main reasons for broadening the molecular weight distribution of ethylene polymers is to obtain better environmental stress crack resistance (ESCR). It has been found that a simple modification in the preparation of vanadium-containing catalysts yields significantly broader molecular weight distributions with slight loss of activity.

The present invention is based upon the discovery of a way to produce a solid vanadium-containing catalyst capable of producing ethylene polymers exhibiting broad molecular weight distribution comprising producing the vanadium component with a metal halide and an organophosphorus compound.

Accordingly an object of this invention is to provide an improved polymerization catalyst.

A further object of this invention is to provide an improved process for the production of olefin polymers.

A further object of this invention is to provide a catalyst system adapted to produce polymers having a broad molecular weight distribution.

Other objects, aspects, as well as the several advantages of the invention will be apparent to those skilled in the art upon reading the specification and the appended claims.

SUMMARY OF THE INVENTION

In accordance with the invention, a vanadium-containing catalyst component is produced by reacting a vanadium halide compound, an organophosphorus compound, and a metal halide under such conditions that a particulate solid is obtained.

In accordance with another embodiment of the invention, a vanadium-containing catalyst component is produced by reacting a vanadium halide compound, an organophosphorus compound, and a metal halide of periodic groups IIIA, IVA and VA under conditions such that a particulate solid is obtained.

In accordance with another embodiment of the invention, the vanadium-containing catalyst component of the invention is combined with a cocatalyst comprising an organoaluminum compound to form a catalyst composition suitable for the polymerization of olefins.

Further in accordance with the invention alpha-olefins are polymerized under polymerization conditions employing the above catalysts.

DETAILED DESCRIPTION OF THE INVENTION

The vanadium compound used in making the particulate catalyst component is selected from those vanadium compounds having a V-X linkage wherein X is a halogen. Typical examples of such compounds are the halides, oxyhalides, alkylhalides, and alkoxyhalides. Especially notable halo-vanadium compounds are those compounds of the formula $VX_{4-n}Y_n$ wherein X is a halogen atom, Y is an alkoxy group with 1 to 12, preferably 1 to 6, carbon atoms or trialkylsiloxy group ($—OSiR^3_3$ group where $R^3$ is an alkyl group with 1 to 12 carbon atoms), and n is a number defined by: $0 \leq n < 4$), and the compounds of the formula: $VOX_{3-m}Y_m$ (wherein X is a halogen atom, Y is an alkoxy group with 1 to 12, preferably 1 to 6, carbon atoms or trialkylsiloxy group ($—OSiR^3_3$ group wherein $R^3$ is an alkyl group with 1 to 12 carbon atoms), and m is a number defined by: $0 \leq m < 3$). More specific examples of compounds having such a V-X linkage are vanadium tetrachloride, vanadium tetrabromide, vanadium tetraiodide, mono-n-butoxy-vanadium trichloride, vanadyl trichloride, vanadyl tribromide, di-n-butoxy-chlorovanadyl, diisopropoxymonochlorovanadyl, mono-n-butoxydichlorovanadyl, monoisopropoxydichlorovanadyl, and monotrimethylsiloxydichlorovanadyl. The currently preferred vanadium compounds are vanadium tetrachloride and vanadyl trichloride, which is also sometimes referred to hereafter as vanadium oxychloride or as $VOCl_3$.

The organophosphorus compound used in preparing the novel particulate catalyst is selected from those having a P-L linkage wherein L is selected from the group consisting of alkyl radicals, alkoxy radicals, aryl radicals, aryloxy radicals, cycloalkyl radicals, cycloalkoxy radicals, cycloalkylaryl radicals, alkylamino radicals, and haloalkoxy radicals. Typical examples of such compounds include tris-N,N-dialkyl phosphoramides, dialkyl phosphites, trialkyl phosphites; trialkyl phosphates, trialkyl phosphines, triaryl phosphines, triaryl phosphine oxides, triaryl phosphites, and haloalkyl phosphites. Generally, the radicals of the L group will have only 1 to 10 carbon atoms.

In an alternative embodiment of the present invention, instead of reacting the metal halide compound and the vanadium and organophosphorus compound, one can merely react the metal halide compound and a vanadium organophosphate-containing functionality of the formula

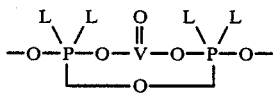

wherein each L is individually selected from the group of L's described above. The preparation of such compounds is disclosed in U.S. Pat. No. 3,595,890. For best results a vanadium organophosphate must be selected that is soluble in the reaction liquid. A particularly preferred type of vanadium organophosphate is the vanadium oxybis(dialkyl phosphates).

In accordance with the invention, a vanadium-containing catalyst compound produced from a vanadium halide and an organophosphorus compound is improved in polymerization activity by contacting the vanadium-containing catalyst component with a metal halide of a metal of periodic groups IIIA, IVA and VA. It is recognized that boron and silicon are included in "metal" halide, though strictly speaking, they are not metallic. Examples of suitable metal halides that can be used according to the invention include halides of boron, aluminum, silicon, tin, phosphorus and antimony. The chlorides of these metals are presently preferred. Specific compounds that have been found effective include aluminum trichloride, aluminum tribromide, boron trichloride, silicon tetrachloride, tin tetrachloride and antimony pentachloride.

The amount of metal halide of Groups IIIA, IVA and VA employed in the present invention is in the range of about 0.1 to about 10, preferably about 0.5 to about 2, moles of metal halide per mole of vanadium halide.

The order of addition of components forming the vanadium-containing catalyst component depends to some extent on the physical state of the metal halide. For solid metal halides, it is necessary to first mix metal halide and organophosphorus compound in the diluent and after a suitable reaction period, e.g., 0.1 to 100 minutes at 0° to 100° C., add vanadium halide. Ordinarily, this reaction results in the formation of a solid component which can be separated, if desired. The separated solids or the resultant reaction mixture can be agitated for, e.g., 0.1 to 100 minutes at 0° to 100° C., and then adding the organoaluminum cocatalyst compound and further agitation can be applied for, e.g., 0.1 minute to 10 hours at 0° to 100° C.

For liquid metal halides, metal halide, vanadium halide, organophosphorus compound and diluent can be mixed in any order or simultaneously. Again the separated solids or reaction mixture can be agitated for, e.g., 0.1 minute to 10 hours at 0° to 100° C. prior to addition of organoaluminum cocatalyst compound and further agitation as above.

It is important to maintain an oxygen-free and moisture-free atmosphere over the catalyst components before, during and after catalyst preparation. Inert gases, such as nitrogen and argon, are preferred.

The catalyst preparation can be carried out in any liquid which allows the recovery of a solid particulate material. The liquids suitable will vary somewhat depending upon the particular combination of reactants selected. It is currently preferred to conduct the reaction in the presence of a liquid consisting essentially of nonaromatic halocarbon. Examples of halocarbons which have been found suitable are 1,1,2-trichlorotrifluoroethane, dichloromethane, 1-chlorobutane, dibromomethane, and tetrachloroethylene. The especially preferred liquid is dichloromethane (methylene chloride). The amount of liquid employed can vary widely, however, if some of the reactants are added in a liquid which is not suitable for the formation of the particulate product, the quantity of such liquid in the final mixture should preferably be less than that which prohibits formation of the desired particulate product.

In the embodiment of the invention involving three reactants (exclusive of organoaluminum cocatalyst compound), the reactants can be combined in any order. It has, however, been noted that the most active catalysts have been obtained from those reactions in which the metal halide is first reacted with the organophosphorus compound and then the resulting product is reacted with the vanadium compound.

The reaction of the reactants can be carried out under any suitable conditions. Generally, the reaction will be conducted at a temperature in the range of about 0° C. to about 100° C. and a pressure in the range of about 10 to about 100 psia. Preferably, the reaction is conducted without the addition of heat and when the addition of a reactant produces an exothermic reaction, the reactant addition is preferably spread out over a period of time such that large temperature increases are avoided.

The particulate solid can be recovered from the reaction mixture by any suitable means. Most typically the solid is separated from the liquid by filtration. In one particularly preferred embodiment, the solid is washed with a hydrocarbon liquid until the solid is substantially free of compounds soluble in said hydrocarbon liquid. Typical suitable wash liquid include liquids of the type generally used as liquid diluent in the polymerization of ethylene. Examples of such liquids include heptane, hexane, pentane, benzene, toluene and the like.

The reactants can be combined in any amounts that will allow the production of recoverable particulate solid. Generally, the P/V atom ratio of the reactants (wherein P is from the organophosphorus compound) is in the range of about 0.2/1 to about 4/1, more preferably in the range of about 0.3/1 to 3/1. Generally, the Al/P atom ratio of the reactants (wherein the Al is from organoaluminum cocatalyst compound) is in the range of about 0.5/1 to about 2/1, more preferably about 1/1.

The solid particulate catalyst of this invention is useful in the polymerization of olefins. It provides particularly surprising results in the production of homopolymers of ethylene and copolymers containing at least 90 mole percent and preferably 95 mole percent ethylene.

Examples of typical olefin monomers include alpha-olefins containing 2 to 20 carbon atoms per molecule, the most preferred being usually those with 2 to 6 carbon atoms per molecule, such as ethylene, propylene, butene-1, 4-methylpentene-1, and hexene-1. Such monoolefins can also be copolymerized with each other and with diolefins, preferably diolefins containing 4 to 20 carbon atoms. Examples of such diolefins include 1,3-butadiene, 1,5-hexadiene, 4-vinylcyclohexene, 1,3-divinylcyclohexane, cyclopentadiene, and the like.

The polymerization may be carried out in any suitable manner. Typically, the polymerization is carried out in a liquid diluent. Typical diluents include hydrocarbons, such as for example, alkanes or cycloalkanes, such as n-butane, n-hexane, n-pentane, n-heptane, cyclohexane, isobutane, methylcyclohexane, or mixtures thereof.

The polymerization pressure is generally in the range of about 15 psia (0.103 MPa) to about 1000 psia (6.89 MPa), more preferably no higher than about 700 psia (4.83 MPa). The temperature is generally selected between 20° C. and 200° C., more preferably between 60° C. and 120° C. The catalyst is suitable for continuous or batch polymerization.

The vanadium-containing catalyst component is used with a cocatalyst comprising an organoaluminum compound.

The organoaluminum compound used in preparing the novel particulate catalyst is selected from those having the formula $AlR'_n X_{3-n}$ wherein X is halogen, each R' is individually selected from the group consisting of alkyl radicals, aryl radicals, cycloalkyl radicals, and alkoxy radicals, and n is a number from 1 to 3. Representative types of compounds having such formulas include dialkylaluminum monohalides, alkylaluminum dihalides, trialkylaluminums, alkyl, cycloalkyl, or arylaluminum sesquihalides, and dialkylaluminum alkoxides. Particularly preferred organoaluminum compounds are diethylaluminum chloride, ethylaluminum dichloride, ethylaluminum sesquichloride, and diethylaluminum ethoxide. The best organoaluminum compound to use varies somewhat depending upon, e.g., the particular organophosphorus compound being used.

In one embodiment of the invention, an organoaluminum cocatalyst and a halocarbon activator, selected from halogen-substituted alkanes having 1 to 10 carbon atoms, more preferably 1 to 5 carbon atoms, per molecule are used with the vanadium-containing catalyst component. Preferred activators are chlorine-substituted alkanes having no more than two chlorines on any primary carbon atom, no more than one chlorine on any secondary carbon atom, and no chlorine on any tertiary carbon atom. Examples of typical activators include dichloromethane, bromochloromethane, 2-bromopropane, 1,2-dibromoethane, dibromomethane, fluorotrichloromethane, 1,1,2-trichloro-1,2,2-trifluoroethane, 1,1,1-trichloroethane, 1,1,2-trichloroethane, 1,2-dichloroethane, 1-fluoropentachloroethane, 1,2-difluoro-1,2-dichloroethane, 1,2-dichlorotetrafluoroethane, dichlorodifluoromethane, 1,2-difluorotetrachloroethane and 1-chlorobutane. The currently preferred activators are dichloromethane and because of its effectiveness, low toxicity, and moderate boiling point, 1,2-difluorotetrachloroethane.

In the practice of this invention, the particulate solid catalyst is effective when used in amounts conventionally used in such reactions, i.e., about 0.03 to 2 g per liter of diluent. However, it is not necessary to use such large amounts of the catalyst and such would, in fact, defeat one of the advantages of the catalyst which is the production of such large levels of polymer per unit of catalyst that one can dispense with removal of catalyst from the polymer. It is, therefore, preferred to use an amount of catalyst which provides about 0.0001 to 0.05 g of vanadium-containing solid catalyst per liter of diluent, more preferably about 0.001 to 0.01 g per liter of diluent.

The amount of cocatalyst employed can vary over a wide range depending upon the particular cocatalyst selected and the results desired. With the preferred organoaluminum cocatalysts enough is used to provide at least 0.3 mole of the cocatalyst per gram atom of vanadium in the particulate solid catalyst employed. More generally the mole ratio of Al in the cocatalyst to vanadium in the catalyst is in the range of about 0.3/1 to 1000/1, more preferably about 1/1 to 500/1.

The ratio of the activator to the cocatalyst can also vary over a wide range. If desired the activator can be used in excess of that needed for maximum activation. Typical ratios for the moles of activator per gram atom of Al would be about 0.5/1 to about 160/1, more preferably in the range of about 3/1 to about 100/1.

The order of addition of the polymerization reaction components is not considered to be particularly critical. Typically in a batch process cocatalyst is added, then activator, then catalyst, then hydrogen, then hydrocarbon diluent, and then monomer. In view of the fact that many halocarbons which permit the formation of the particulate solid are also activators, it is possible to prepare the particulate solid directly in the reaction vessel eliminating the need for recovering the catalyst. For example, a vanadium compound such as $VCl_4$ and a phosphorus compound such as triethyl phosphite can be added to $CH_2Cl_2$ in the polymerization vessel to form a solution and then a metal halide compound can be added to cause formation of the particulate solid. Subsequently, hydrocarbon diluent and cocatalyst can be added to the polymerization vessel.

The mean molecular weight based on the melt index of the polymers produced using the inventive catalyst can be regulated by the employment of molecular weight modifier, such as for example, hydrogen. The high hydrogen response of the vanadium-containing catalyst can lead to very low molecular weight polyethylenes when the ethylene pressure is reduced by hydrogen. Thus, if an attempt is being made to produce high molecular weight polyethylenes, hydrogen control would have to be closely monitored.

It has also been noted that by varying the P/V ratio in the catalyst, it is possible to control to some extent the molecular weight distribution of the ethylene polymer.

The density of polymers obtained from ethylene can be varied by copolymerization with butene-1 or other 1-olefin as known in the art.

The polyolefins obtained by the process of this invention can be used by all who know fabricating techniques such as extrusion, injection, blow extrusion or rolling.

A further understanding of the present invention and its advantages will be provided by the following examples resulting from the applicant's research.

EXAMPLE I

Inventive catalysts employing aluminum chloride and either trialkyl phosphite or trialkyl phosphate were prepared employing the following procedure.

The organophosphorus compound was added to a suspension of aluminum chloride in methylene chloride under a nitrogen or argon atmosphere. A solution of vanadium tetrachloride in methylene chloride was added. After 10–15 minutes of stirring, a solution of ethylaluminum dichloride (EADC) in n-heptane was added. The resulting slurry was stirred for 0.5–5 hours, filtered under argon atmosphere, washed with hexane and dried under argon.

Amounts of components, reaction conditions and amount of solid product are given in Table 1.

Amounts of components, reaction conditions, and amount of solid product are given in Table 2.

TABLE 1

| Run | Organo P[a] Type | mmoles | AlCl$_3$, mmoles | CH$_2$Cl$_2$, mL | VCl$_4$,[b] mmoles | EADC,[c] mmoles | Product, g |
|---|---|---|---|---|---|---|---|
| 1C | (EtO)$_3$PO | 7.14 | 3.52 | 20 | 7.14 | 7.2 | 4.2 |
| 2C[d] | (EtO)$_3$PO | 7.14 | 7.14 | 20 | 7.14 | 7.2 | 5.64 |
| 3C | (EtO)$_3$PO | 7.14 | 14.2 | 40 | 7.14 | 7.2 | 4.10 |
| 4C | (BuO)$_3$PO | 7.14 | 7.14 | 25 | 7.14 | 7.2 | 3.95 |
| 5C | (BuO)$_3$PO | 7.14 | 14.2 | 20 | 7.14 | 7.2 | 3.84 |
| 6C | (MeO)$_3$P | 7.14 | 7.14 | 20 | 7.14 | 7.2 | 1.14 |
| 7C | (EtO)$_3$P | 7.14 | 7.14 | 20 | 7.14 | 7.2 | 3.06 |

[a]Organophosphorus compound
(EtO)$_3$PO = Triethyl phosphate
(BuO)$_3$PO = Tri-n-butyl phosphate
(EtO)$_3$P = Triethyl phosphite
(MeO)$_3$P = Trimethyl phosphite
[b]Vanadium tetrachloride in methylene chloride, 3.5–4 M.
[c]Ethylaluminum dichloride in n-heptane, approx. 1.5 M.
[d]After EADC addition, heated at 80° C. with stirring for 1 hr.

TABLE 2

| Run | Organo P Type | mmoles | Metal Halide Type | mmoles | CH$_2$Cl$_2$, mL | VCl$_4$, mmoles | EADC, mmoles | Product, g |
|---|---|---|---|---|---|---|---|---|
| 8C | (EtO)$_3$PO | 7.8 | AlBr$_3$ | 7.8 | 25 | 7.8 | 7.8 | 3.14 |
| 9C | (BuO)$_3$PO | 7.8 | AlBr$_3$ | 15.7 | 25 | 7.8 | 7.8 | 3.62 |
| 10C | (EtO)$_3$PO | 6.3 | BCl$_3$ | 12.5 | 20 | 6.3 | 6.3 | 1.31 |
| 11C[a] | (BuO)$_3$PO | 6.3 | BCl$_3$ | 12.6 | 20 | 6.3 | 6.3 | 3.2 |
| 12C | (EtO)$_3$PO | 6.3 | SiCl$_4$ | 12.6 | 20 | 6.3 | 6.3 | 1.65 |
| 13C | (BuO)$_3$PO | 7.8 | SiCl$_4$ | 15.7 | 25 | 7.8 | 7.8 | 2.65 |
| 14C | (EtO)$_3$PO | 6.3 | SnCl$_4$ | 12.6 | 20 | 6.3 | 6.3 | 1.8 |
| 15C | (BuO)$_3$PO | 7.8 | SnCl$_4$ | 15.7 | 25 | 7.8 | 7.8 | 2.59 |
| 16C | (BuO)$_3$PO | 7.8 | SbCl$_5$ | 15.7 | 25 | 7.8 | 7.8 | 2.71 |

[a]VCl$_4$, CH$_2$Cl$_2$, (BuO)$_3$PO and 6.3 mmole BCl$_3$ were mixed and stirred for 3 hours then allowed to stand for 20 hours. Since no solid was observed the solution was heated at 100° C. for 2 hours. An additional 6.3 mmole BCl$_3$ was added. No solid was observed. Then added EADC, stirred 4 hours and filtered under argon.

EXAMPLE 2

Inventive catalysts employing one of the following: aluminum bromide, boron trichloride, silicon tetrachloride, tin tetrachloride and antimony pentachloride, in combination with vanadium tetrachloride and either triethyl phosphate or tri-n-butyl phosphate were prepared according to the following procedures.

Inventive catalysts prepared using aluminum bromide were prepared as described in Example 1 by substitution of aluminum bromide for aluminum chloride.

Inventive catalysts prepared using the above-mentioned chlorides of boron, tin, silicon and antimony were prepared by first mixing, under argon or nitrogen, vanadium tetrachloride solution in methylene chloride and trialkyl phosphate, and then adding the above-described metal chloride. After stirring at room temperature for 0.25 to 5 hours, a solution of ethylaluminum dichloride (EADC) in n-heptane was added. After being stirred an additional 0.25 to 5 hours at room temperature, the solid product was isolated by filtration, washing with hexane and drying (all under argon).

EXAMPLE 3

The inventive catalysts prepared in Examples 1 and 2 were used for the polymerization of ethylene.

All polymerizations were carried out at 100° C. in a 1 gallon, packed, Autoclave Engineers stirred reactor. The autoclave was partly filled with heptane and heated to above 150° C. Hot heptane was flushed out through the bottom valve with nitrogen and the heating continued for 10 minutes before flushing the reactor with nitrogen and isobutane 3 times. Cooling water was circulated through the jacket to bring the temperature below 40° C. at which time cocatalyst, methylene chloride activator, catalyst, hydrogen and then 2 L of isobutane were charged. After raising the temperature to 100° C., ethylene was added to give the desired pressure and maintained at that pressure for 1 hour. Following venting the volatiles to a flare line, the dry polymer was removed from the reactor.

Polymerization parameters and results are given in Table 3.

TABLE 3

| Run[f] | Metal Chloride | M/Al[a] | M/V[b] | Organo P | Productivity[c] | MI[d] | HLMI/MI[e] |
|---|---|---|---|---|---|---|---|
| 1P | AlCl$_3$ | 0.5 | 0.5 | (EtO)$_3$PO | 18,600 | 1.7 | 54 |
| 2P | AlCl$_3$ | 1 | 1 | (EtO)$_3$PO | 10,100 | 0.23 | 127 |
| 3P | AlCl$_3$ | 2 | 2 | (EtO)$_3$PO | 530 | 0.85 | 255 |
| 4P | AlCl$_3$ | 1 | 1 | (BuO)$_3$PO | 20,400 | 0.06 | 80 |
| 5P | AlCl$_3$ | 2 | 2 | (BuO)$_3$PO | 4,300 | 0.61 | 143 |
| 6P | AlCl$_3$ | 1 | 1 | (MeO)$_3$P | 9750 | 3.2 | 48 |
| 7P | AlCl$_3$ | 1 | 1 | (EtO)$_3$P | 24,700 | 0.92 | 59 |
| 8P | AlBr$_3$ | 1 | 1 | (EtO)$_3$PO | 6,520 | 3.6 | 40 |
| 9P | AlBr$_3$ | 2 | 2 | (BuO)$_3$PO | 4,480 | 0.40 | 91 |
| 10P | BCl$_3$ | 2 | 2 | (EtO)$_3$PO | 14,700 | 0.06 | 167 |
| 11P | BCl$_3$ | 2 | 2 | (BuO)$_3$PO | 7,900 | 0.29 | 105 |

TABLE 3-continued

| Run[f] | Metal Chloride | M/Al[a] | M/V[b] | Organo P | Productivity[c] | MI[d] | HLMI/MI[e] |
|---|---|---|---|---|---|---|---|
| 12P | SiCl$_4$ | 2 | 2 | (EtO)$_3$PO | 18,500 | 0.45 | 68 |
| 13P | SiCl$_4$ | 2 | 2 | (BuO)$_3$PO | 6,400 | 2.7 | 85 |
| 14P | SnCl$_4$ | 2 | 2 | (EtO)$_3$PO | 13,200 | 0.25 | 240 |
| 15P | SnCl$_4$ | 2 | 2 | (BuO)$_3$PO | 8,260 | 0.80 | 86 |
| 16P | SbCl$_5$ | 2 | 2 | (BuO)$_3$PO | 9140 | 5.6 | 68 |
| 17P[g] | none | — | — | (EtO)$_3$PO | 22,700 | 0.23 | 86 |
| 18P[g] | none | — | — | (BuO)$_3$PO | 23,100 | 0.13 | 90 |
| 19P[g] | none | — | — | (EtO)$_3$P | 54,700 | 1.9 | 47 |

[a] Metal chloride/EADC mole ratio
[b] Metal chloride/VCl$_4$ mole ratio
[c] Grams polymer per gram catalyst per hour.
[d] MI = melt index. ASTM D1238, Condition E.
[e] HLMI = high load melt index. ASTM D1238, condition F.
[f] Polymerization run numbers correspond to catalyst run numbers in Table 1 and 2.
[g] Control runs using catalyst prepared as in Example 1 except that no aluminum chloride was used.

EXAMPLE 4

Ethylene/1-hexene copolymers were prepared using inventive catalysts prepared in the presence of AlCl$_3$ and also using a comparative catalyst prepared in the absence of AlCl$_3$. Environmental stress cracking resistance (ESCR) of the copolymers was determined.

The inventive catalysts of this example were prepared as described in Example 1 using triethyl phosphate and an AlCl$_3$/VCl$_4$ molar ratio of 1/1. The comparative catalyst was prepared in a fashion similar to the inventive catalysts except that AlCl$_3$ was not employed.

The above catalysts were employed in polymerizations conducted as described in Example 3 except that 1-hexene (25 mL) was added to the reactor prior to the addition of ethylene.

Table 4 contains the results of the polymerizations and properties of the resultant polymers.

TABLE 4

| Run | Al/V[a] | Productivity | MI | HLMI | ESCR[b] |
|---|---|---|---|---|---|
| 20 (comp) | c | 10,300 | 0.05 | 7.7 | 73 |
| 21 (inv.) | 1 | 21,700 | 0.25 | 26 | 251 |
| 22 (inv.) | 1 | 21,500 | 0.40 | 38 | 282 |

[a] AlCl$_3$/VCl$_4$ mole ratio
[b] Environmental stress crack resistance (hours) determined by bent strip method - ASTMD 1963, condition A.
[c] AlCl$_3$ was not used The data in Table 4 demonstrate that both productivity and ESCR were superior when the inventive catalysts were employed in copolymerization of ethylene and 1-hexene.

What is claimed is:

1. A process for the production of ethylene polymers comprising polymerizing ethylene or mixtures of ethylene and minor amounts of higher mono-olefin containing 3 to 20 carbon atoms per molecule under suitable reaction conditions in the presence of a catalyst comprising a solid particulate catalyst produced by reacting in liquid reactants which allows the recovery of a solid particulate material
   (1) a vanadium compound havng a V-X linkage where X is halogen,
   (2) at least one metal halide selected from the group consisting of aluminum trichloride, aluminum tribromide, boron trichloride, silicon tetrachloride, tin tetrachloride, and antimony pentachloride and
   (3) an organophosphorus compound having a P-L linkage wherein L is selected from the group consisting of alkyl radicals, alkoxy radicals, aryl radicals, aryloxy radicals, cycloalkyl radicals, cycloalkoxy radicals, cycloalkylaryl radicals, alkylamino radicals, and haloalkoxy radicals, or
   (4) reacting a metal halide compound as defined in (2) and vanadium organophosphate-containing functionality of the formula

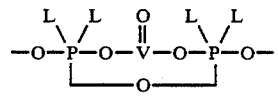

wherein each L is individually selected from the group consisting of the L's as defined for (3), under conditions suitable for obtaining a particulate solid product, and
   (5) combining said particulate product with an organoaluminum cocatalyst compound having the formula AlR$^1_n$X$_{3-n}$ wherein X is halogen, each R$^1$ is individually selected from the group consisting of alkyl, aryl, cycloalkyl and alkoxy radicals, and n is a number from 1 to 3 to form an active solid catalyst.

2. A process according to claim 1 wherein at least 90 percent of said monomers are ethylene and the remaining monomers are other mono-olefins containing 3 to 6 carbon atoms per molecule.

3. A process according to claim 2 wherein said polymerization is conducted in the presence of a cocatalyst system comprising at least one organoaluminum compound selected from trialkylaluminum, alkylaluminum halides, and alkylaluminum alkoxides wherein each alkyl group is individually selected from the same or a different alkyl radical having 1 to 20 carbon atoms.

4. A process according to claim 3 wherein each said organoaluminum compound is selected from alkylaluminum dichlorides.

5. A process according to claim 3 wherein said monomer comprises ethylene or a mixture of ethylene and 1-hexene.

6. A process according to claim 4 wherein said particulate catalyst has been washed free of hydrocarbon soluble components prior to use in the polymerization.

7. A process according to claim 4 wherein said particulate catalyst is prepared from VCl$_4$, at least one of AlCl$_3$, AlBr$_3$, BCl$_3$, SiCl$_4$, SnCl$_4$ and SbCl$_5$, and at least one compound selected from triethyl phosphite, tributyl phosphate, triethyl phosphate, and trimethyl phosphite.

8. A polymer of ethylene produced by the process of claim 3.

9. A process according to claim 7 wherein said monomer comprises ethylene or a mixture of ethylene and 1-hexene.

10. A process according to claim 1 wherein the said particulate solid is produced in a liquid comprising a nonaromatic halocarbon.

11. A process according to claim 1 wherein the reaction is conductd at temperature in the range of about 0° C. to about 100° C., the P/V molar ratio of the reactants is in the range of about 0.2/1 to about 4/1, the moles of metal halide per mole of vandadium halide ranges from about 0.1 to about 10, and the polymerization temperature ranges from about 20° C. to about 200° C.

12. A process according to claim 1 wherein said organoaluminum cocatalyst additionally contains a halocarbon activator selected from halogen-substituted alkanes having 1 to 10 carbon atoms.

13. A process according to claim 1 wherein said particulate solid is produced in a liquid comprising a nonaromatic halocarbon and said active solid catalyst is washed with a hydrocarbon liquid until the solid is substantially free of compounds soluble in said hydrocarbon liquid prior to polymerization.

14. A process according to claim 10 wherein said halocarbon is methylene chloride (dichloromethane).

15. A process according to claim 10 wherein said halocarbon is selected from 1,1,2-trichlorotrifluorethane, dichloromethane, 1-chlorobutane, dibromomethane, and tetrachloroethylene.

16. A process according to claim 12 wherein said halocarbon is methylene chloride(dichloromethane).

* * * * *